UNITED STATES PATENT OFFICE.

EDWARD SMALL, OF BALTIMORE, MARYLAND.

WIRE-SOLDER COATED WITH FLUX.

SPECIFICATION forming part of Letters Patent No. 255,344, dated March 21, 1882.

Application filed February 14, 1882. (Specimens)

*To all whom it may concern:*

Be it known that I, EDWARD SMALL, a citizen of the United States, residing at Baltimore, in the State of Maryland, have invented certain new and useful Improvements in Wire-Solder Coated with Flux, of which the following is a specification.

This invention has particular reference to wire-solder exteriorly provided with flux; and the object of the invention is to contrive an article of wire-solder and flux adapted to be used in soldering-machines where great lengths of wire-solder are wound on reels or coils.

I provide the wire-solder exteriorly with flux by the following process: The surface of the coil of solder wire is first slightly oiled with any suitable oil; then it is passed into a vessel containing pulverized rosin, some of which adheres to the oiled surface of the wire. The wire thus coated with oil and rosin is placed in proximity to a heating-flame or suitable furnace, which melts the rosin and forms a thin glaze of fluxing material on the solder wire, which, being non-friable, will not crack or drop off, and this operation may be repeated until any required proportion of flux has adhered. Thus prepared, it may be wound on reels, coiled, or otherwise packed preparatory to use. Wires of small size may be thus prepared which are particularly adapted for use in soldering-machines, as the flexible wire-solder itself is the medium by which the flux is conveyed to the joint.

It may be that other methods may be employed to cause the flux in a non-friable condition to adhere to the wire.

I am aware that solder in various shapes, including wire in the form of a ring for capping cans, has heretofore been coated or supplied with flux of a liquid character for immediate use or of a brittle or friable nature; but such articles of solder are not in lengths, nor are they adapted to be made in great lengths, like the wire here described, since if so made it would be necessary to wind or coil the wire, and such treatment would cause the coating of flux as it has heretofore been employed to crack and come off. I am also aware that sheet metal designed for patch-plate has been coated with solder and a non-friable flux; but none of the articles here referred to, nor any others of which I have knowledge are capable of being made in wires of great length, but of small size and flexible, so as to be wound on reels for use in machines.

I reserve the right to file another application for a patent relating to a process for soldering sheet-metal vessels where wire-solder is made the medium for conveying flux to the joint to be soldered.

Having described my invention, I claim and desire to secure by Letters Patent of the United States—

1. The method herein described for providing wire-solder on its exterior with flux, consisting of first oiling the surface of the wire, then causing powdered rosin to adhere to the oiled surface, then subjecting the wire to heat, which melts the rosin, as set forth.

2. A new article of manufacture, flexible solder wire exteriorly provided with a non-friable flux, as set forth.

In testimony whereof I affix my signature in presence of two witnesses.

EDWARD SMALL.

Witnesses:
EWD. WILLIAMS,
JNO. T. MADDOX.